May 14, 1968      R. I. NAGEL      3,383,676
LENTICULAR SIGNAL LENS HAVING A SMOOTH OUTER SURFACE
Filed Feb. 14, 1963      5 Sheets-Sheet 1
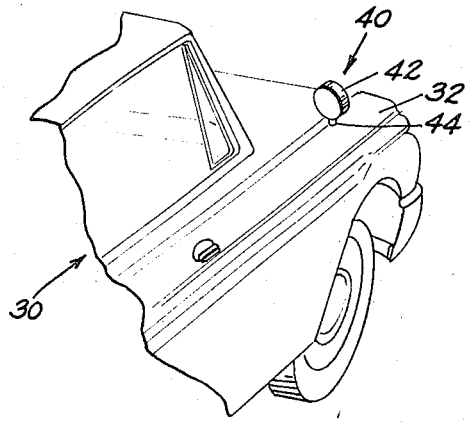
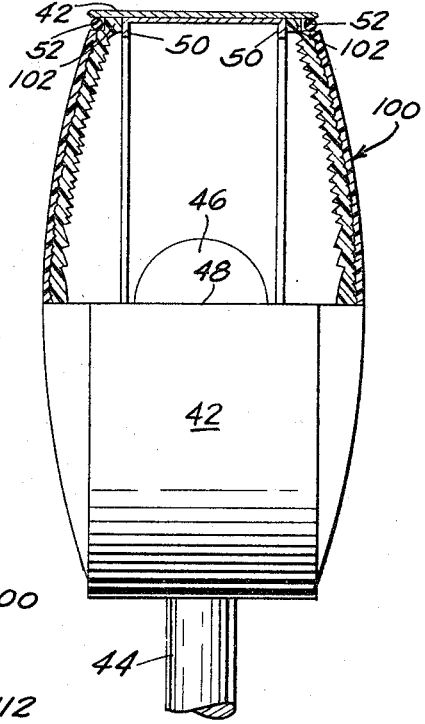
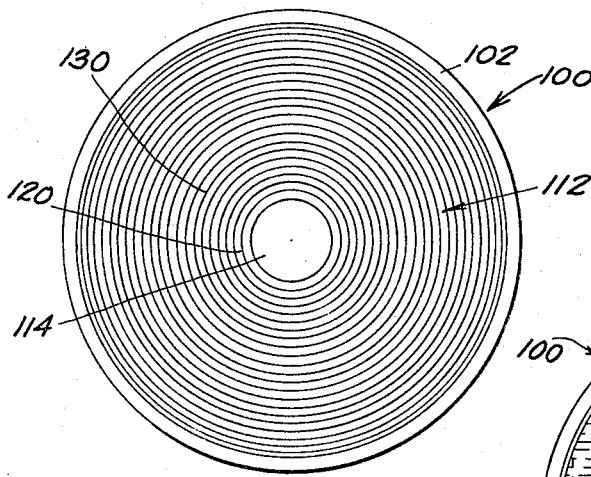
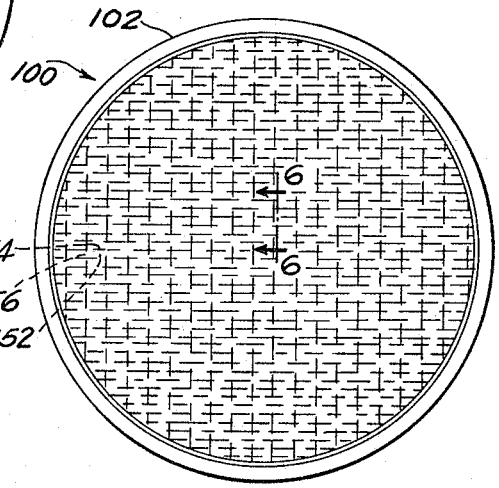
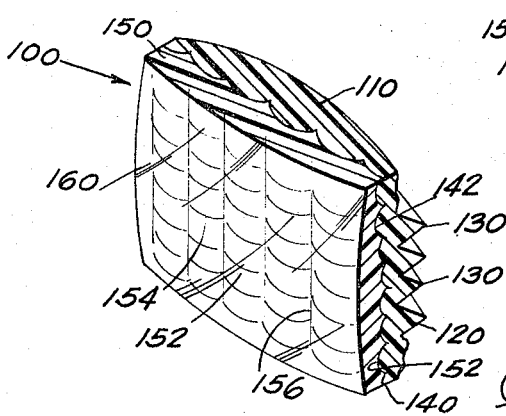
INVENTOR.
ROBERT I. NAGEL

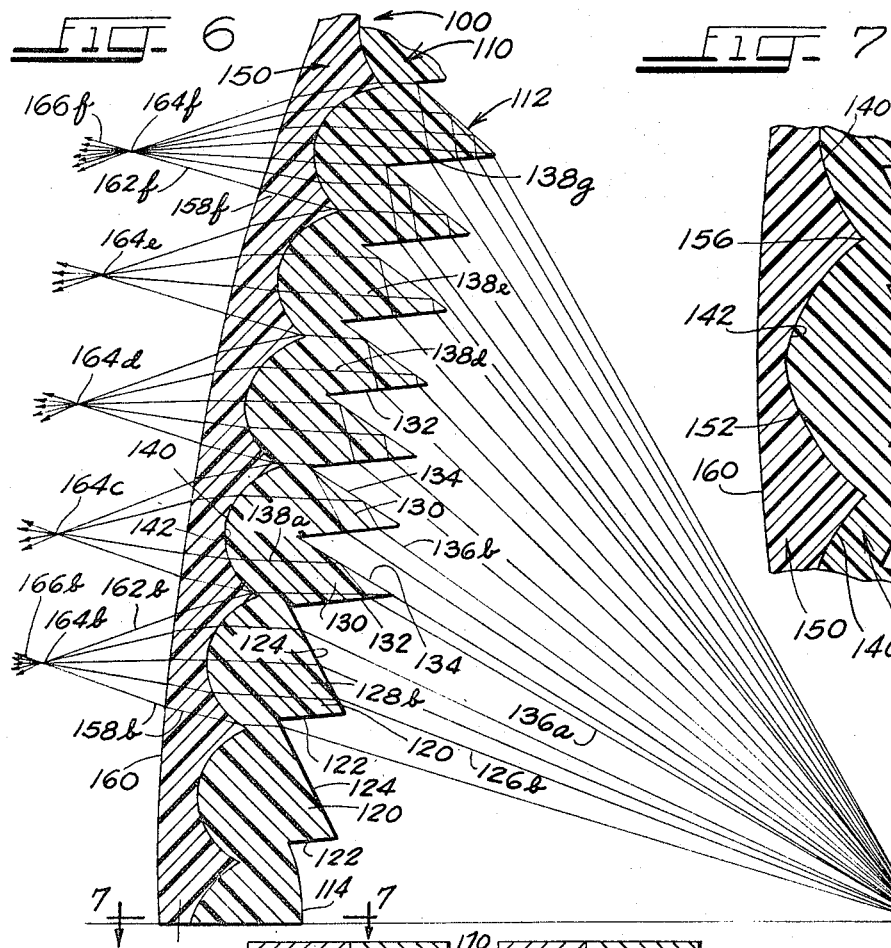
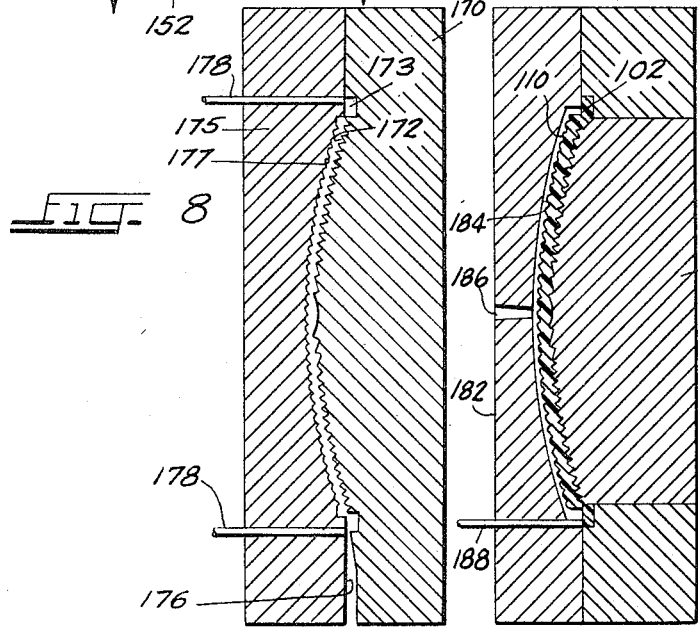

May 14, 1968  R. I. NAGEL  3,383,676
LENTICULAR SIGNAL LENS HAVING A SMOOTH OUTER SURFACE
Filed Feb. 14, 1963  5 Sheets-Sheet 3
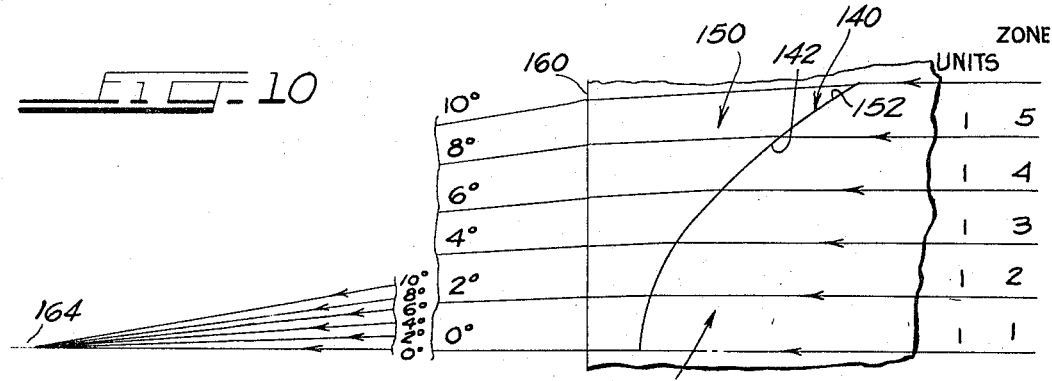
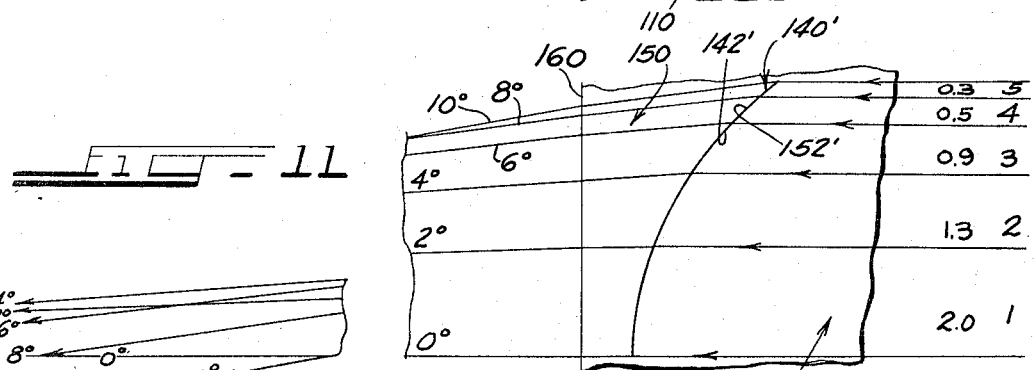
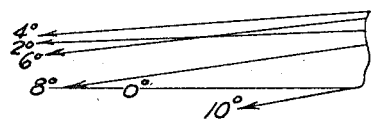
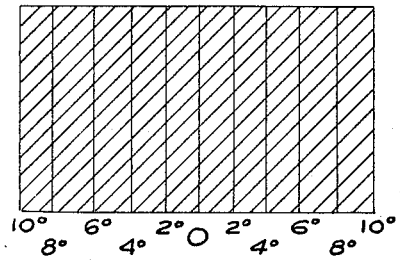
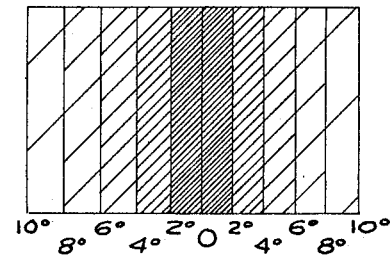
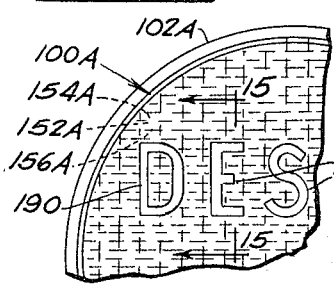
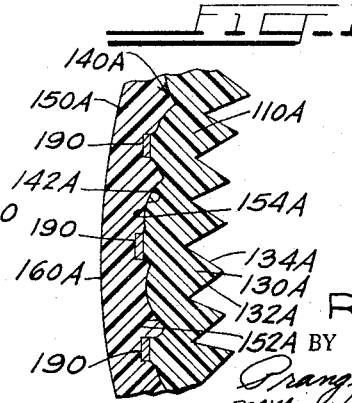
INVENTOR.
ROBERT I. NAGEL
BY
Prangley, Baird, Clayton,
Miller, Vogel
ATT'YS.

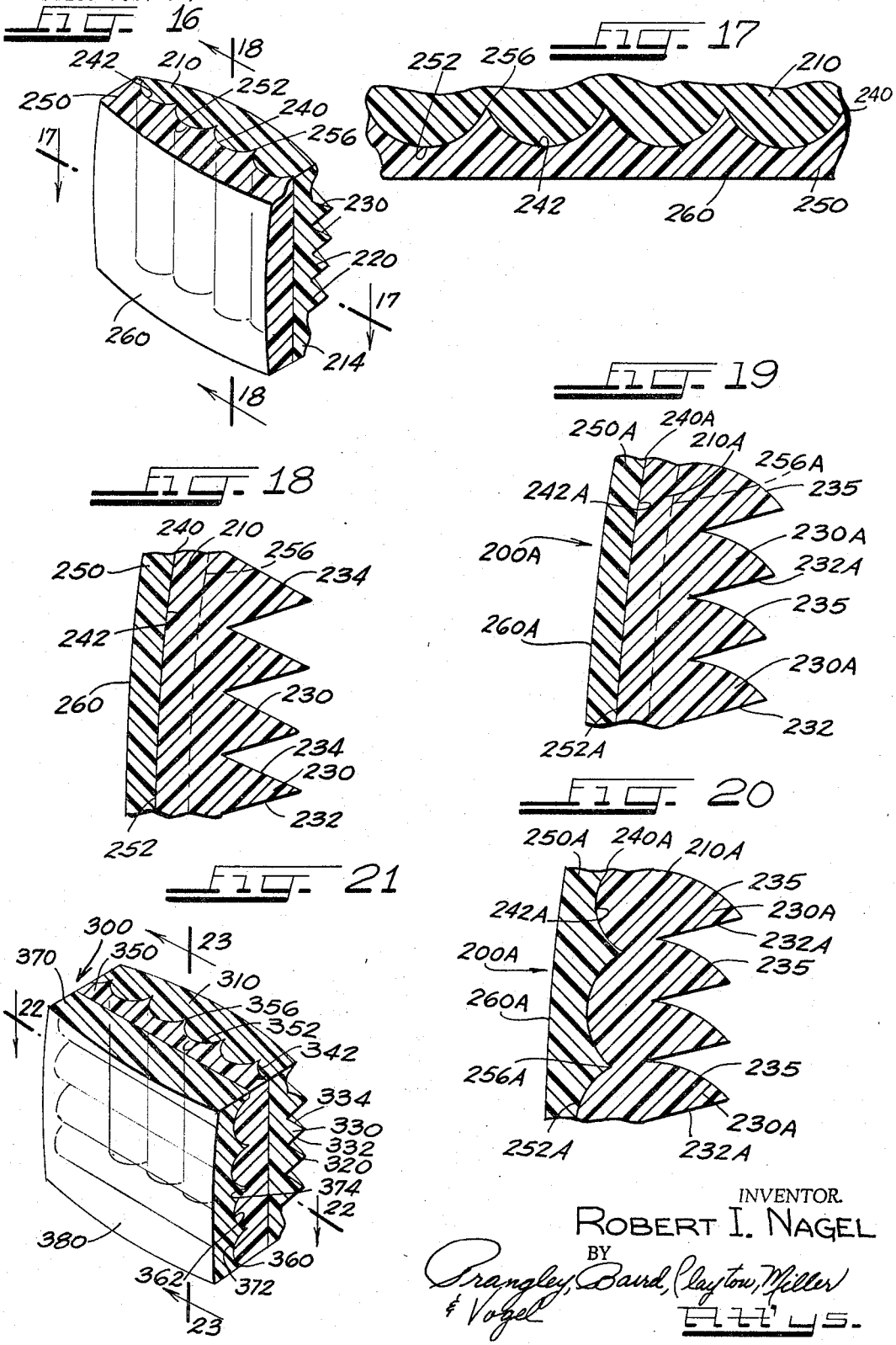

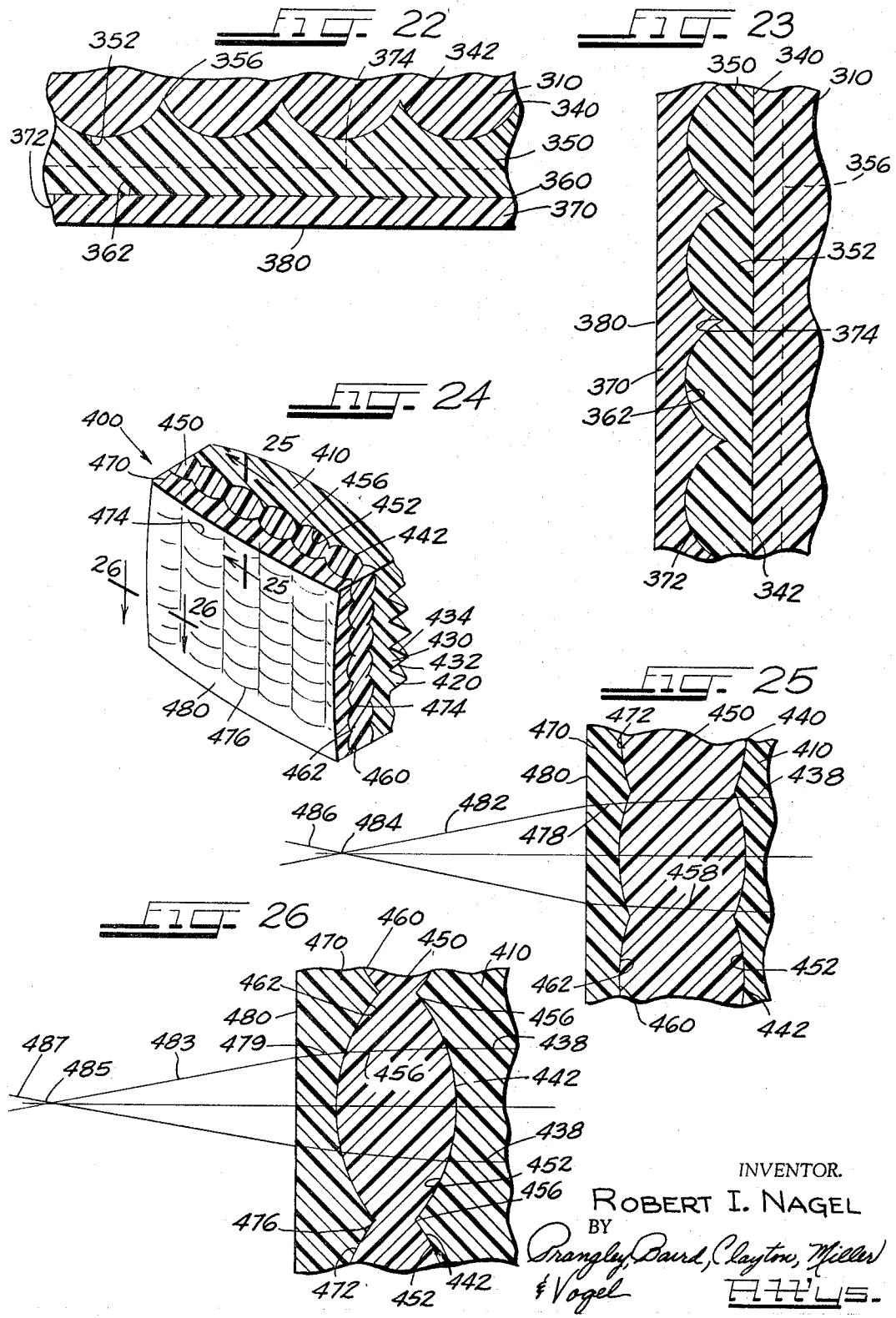

United States Patent Office 3,383,676
Patented May 14, 1968

3,383,676
LENTICULAR SIGNAL LENS HAVING A
SMOOTH OUTER SURFACE
Robert I. Nagel, 3729 Roth, Skokie, Ill. 60076
Filed Feb. 14, 1963, Ser. No. 258,453
15 Claims. (Cl. 340—383)

This invention relates to lenses and methods of making lenses, and particularly to lenses and methods of making lenses having controlled spreading optical elements covered and protected by an overlying plastic body intimately contacting and adhered thereto and provided with a smooth outer weather surface.

The lenses of the present invention are of general utility and may be applied to any type of light control application such as interior illuminating devices, street lighting refractors, headlights, signalling lights, and the like. However, certain of the important objects and advantages are most fully realized when the invention is applied to signal lenses and, accordingly, the invention will be described as applied thereto.

In a typical prior signal lens, it has been customary to provide light collimating optical elements on the rear surface thereof to collect and direct light from generally a point or line source into a substantially parallel bundle of light rays within the signal lens. The front surface of the signal lens has been provided with controlled spreading optical elements which direct the collimated light into a predetermined pattern such as a rectangle, a triangle, or the like, and in certain instances into a combination of patterns for certain specific applications. The controlled spreading optical elements characteristically protrude from the front surface of the signal lens and the meeting lines between the optical elements on the front face provide crevices, depressions, pits and the like. During use, foreign material such as dust, rain or snow collect in the crevices, depressions and pits and therefore reduce the total light transmitted by the lens. Water droplets in the crevices, depressions and pits further form lenses which distort the pattern and cause diffusion of the light and subsequent lowering of the beam candlepower.

Prior attempts to protect the optical elements on the front surfaces of signal lenses include the use of a window having a plane outer surface in front of the signal lens. However, this method requires sealing the two components around the periphery thereof to prevent the entry of dirt or water therebetween. Even if the adjacent surfaces are maintained free of dirt and water by proper sealing, the additional two air-to-lens interfaces reduce by approximately 10% the light transmitted through the lens system. Any water vapor that may be inadvertently trapped between the lens and the cover or window also condenses during cold weather creating diffusing water droplets which reduce the effectiveness of the signal from the signal lens.

Accordingly, it is an important object of the present invention to provide an improved lens which possesses all of the light control properties of lenses known heretofore and yet has a smooth and regular front surface free of pits and crevices and the like, thereby readily to shed therefrom water and dirt and other debris falling thereon.

In connection with the foregoing object, it is another object of the invention to provide an improved lens of the type set forth wherein there is a minimum loss of light transmitted thereby.

Another object of the invention is to provide an improved lens of the type set forth wherein synthetic organic plastics can be used as the material of construction, and more specifically, two or more synthetic organic plastics may be used to provide a unitary lens.

In connection with the foregoing object, it is another object of the invention to provide an improved lens of the type set forth wherein the outer portion of the lens is formed of a weather-resistant plastic serving as an ultraviolet shield or absorber thereby to permit the use of less expensive plastics in the rear portions of the lens, inasmuch as the rear portions of the lens are protected from the weather and ultraviolet radiation.

Another object of the invention is to provide in a lens of the type set forth an improved controlled spreading optical element producing an uniform light pattern from the lens.

Yet another object of the invention is to provide an improved lens having two interior interfaces, one of the interfaces having optical elements thereon controlling the spreading of light in one direction and the other interface having optical elements thereon controlling the spreading of light in another direction, the optical elements having simpler geometric shapes that can be produced more readily and more economically using standard machine techniques.

In connection with the foregoing object, it is another object of the invention to provide improved shapes of optical elements such that the dies for forming the optical elements can be produced more simply and more economically using standard die forming machines and techniques.

Still another object of the present invention is to provide a lens of the type set forth formed of two plastics having a single interface therebetween containing controlled spreading optical elements and an opaque design disposed at the interface and protected from the weather, wear, vandalism and the like.

A further object of the invention is to provide improved methods of forming the improved lenses of the present invention.

Further features of the invention pertain to the particular arrangement of the elements of the lens and to the particular arrangement of the steps of the method, whereby the above outlined and additional operating features thereof are attained.

The invention, both as to its organization and method of operation, together with further objects and advantages thereof, will best be understood by reference to the following specification when taken in connection with the accompanying drawings in which:

FIGURE 1 is a partial view of a front fender of a truck having mounted thereon a turn signal including as a part thereof an improved lens made in accordance with and embodying the principles of the present invention;

FIG. 2 is an enlarged side elevational view, with certain portions broken away, of the turn signal illustrated in FIG. 1;

FIG. 3 is a further enlarged front elevational view of one of the lenses of the present invention in the turn signal of FIGS. 1 and 2;

FIG. 4 is a rear view of the lens of FIG. 3;

FIG. 5 is a fragmentary view in perspective showing certain details of construction of the lens of FIGS. 3 and 4;

FIG. 6 is a further enlarged view in section as seen in the direction of the arrows along the line 6—6 in FIG. 3;

FIG. 7 is a fragmentary view in section through the lens as seen in the direction of the arrows along the line 7—7 of FIG. 6;

FIG. 8 is a diagrammatic view illustrating the molding of one of the transparent bodies forming a part of the lens of FIGS. 3 to 7;

FIG. 9 is a diagrammatic view similar to FIG. 8 and illustrating the molding of the second transparent body against the first transparent body to form the lens of FIGS. 3 to 7;

FIG. 10 is a diagrammatic view illustrating the distribution of collimated light by an aspherical optical element of the present invention;

FIG. 11 is a diagrammatic view illustrating the distribution of collimated light by a spherical optical element in a lens of the present invention;

FIG. 12 is a diagrammatic representation of the distribution of light from the aspherical optical element illustrated in FIG. 10;

FIG. 13 is a diagrammatic representation of the distribution of light from the spherical optical element illustrated in FIG. 11;

FIG. 14 is a fragmentary plan view of the front of a lens made in accordance with the present invention and having an opaque design incorporated therein;

FIG. 15 is a view in section along the line 15—15 of FIG. 14;

FIG. 16 is a fragmentary perspective view illustrating a lens made in accordance with the present invention and comprising two transparent bodies having a single interface therebetween in which are formed optical elements curved in one direction and linear in a direction perpendicular to the curved direction, whereby to provide a control for light in the direction of curvature and to provide a form of element for which a die can be formed using simple forming techniques;

FIG. 17 is an enlarged view in horizontal section along the line 17—17 of FIG. 16;

FIG. 18 is an enlarged view in vertical section along the line 18—18 of FIG. 16;

FIG. 19 is a view similar to FIG. 18 showing curved reflecting surfaces on the catadioptric optical elements to provide for control of the light in the vertical direction;

FIG. 20 is a view similar to FIG. 19 but taken at a point displaced 90° around the lens;

FIG. 21 is a fragmentary perspective view of a lens made in accordance with the present invention and including three transparent bodies having two spaced apart interfaces, the rear interface having optical elements curved in a horizontal direction and linear in a vertical direction to provide controlled spreading of light in the horizontal directions, and the forward interface having optical elements thereon curved in a vertical direction and linear in a horizontal direction to provide controlled spreading of light in the vertical direction;

FIG. 22 is an enlarged view in horizontal section along the line of 22—22 of FIG. 21;

FIG. 23 is an enlarged view in vertical section along the line 23—23 of FIG. 21;

FIG. 24 is a fragmentary view in perspective of a lens made in accordance with the present invention and including three juxtaposed transparent bodies having two interfaces therebetween, both of the interfaces having spherical optical elements thereon curved in all directions to give a compound control of the light passing therethrough;

FIG. 25 is an enlarged fragmentary view in vertical section along the line 25—25 of FIG. 24; and FIG. 26 is an enlarged fragmentary view in horizontal section along the line 26—26 of FIG. 24.

As has been pointed out above, the lens of the present application is of general utility and may be used generally in the control of light; more specifically, the lens of the present invention is useful in interior illuminating devices, street lighting refractors, headlights, signal lights, and the like. However, certain of the advantages of the invention are most fully realized when the lens is used as a part of a signal device, for example, an automobile turn signal, and accordingly, the invention will be so described.

Referring to FIG. 1 of the drawings, there is illustrated a portion of the front of a truck 30 including a fender 32 on which is mounted a turn signal generally designated by the numeral 40. Additional details of the construction of the turn signal 40 are shown in FIG. 2, wherein it will be seen that the turn signal 40 includes a housing 42 generally cylindrical in shape and supported upon a hollow post 44 which serves to mount the turn signal 40 upon the fender 32 and also accommodates therethrough electrical connections for the light source in the turn signal 40. There is positioned substantially centrally within the housing 42 a light bulb 46 to which is made an electrical connection with the power supply of the truck through the post 44, and more specifically, the light bulb 46 comprises a filament 48 which is heated to incandescence during use and is the actual source of the light for the turn signal 40. Disposed within the housing 42 and spaced apart and toward the ends thereof are two circular flanges 50 extending radially inwardly and adapted to receive thereagainst two identical lenses each generally designated by the numeral 100, each lens 100 having a circular flange 102 extending therearound and abutting against the respective adjacent housing flange 50. In order to hold the lenses 100 in position, each of the lenses 100 is provided with a lens retaining ring 52 which urges the adjacent lens flange 102 against the adjacent housing flange 50 to lock the associated lens 100 in the assembled position. In passing it is noted that the light source in the form of the filament 48 is disposed relatively close to the adjacent surface of each of the lenses 100, and more specifically, the light striking the outer edges of the lenses 100 must be redirected through a substantial angle in order to be available for use as an effective light signal.

The lenses 100 are identical in construction and therefor only one will be described in detail, the lenses 100 being generally of the Fresnel type and including light collimating optical elements and controlled spreading optical elements to produce the desired signal.

Referring to FIGS. 3 through 7 of the drawings, the lens 100 is generally circular in shape and has a generally concave rear surface and a generally convex front surface. More particularly, the lens 100 is formed of two transparent bodies of plastic, namely, a first or rear transparent plastic body generally designated by the numeral 110 and a second or front transparent plastic body generally designated by the numeral 150, the two bodies 110 and 150 being joined at an interface generally designated by the numeral 140. Although any suitable plastic that is optically clear may be used in the present invention, it is preferred to use synthetic organic plastics, FIGS. 3 to 7 of the drawings illustrating a lens in which the rear plastic body 110 is formed of polystyrene plastic and the front plastic body 150 is formed of an acrylic plastic such as a methyl methacrylate plastic or an ethyl methacrylate plastic.

The rear surface of the plastic body 110 is generally designated by the numeral 112 and has a plurality of optical elements thereon including a convex central optical element 114, two concentric dioptric rings generally designated by the numeral 120, and a plurality of concentric catadioptric rings generally designated by the numeral 130, all cooperating to collimate the light from the source 48 striking the rear surface 112. Each of the dioptric rings 120 includes an inner surface 122 and an outer refracting surface 124 useful in refracting light rays from the source 48 into a collimated bundle of light. More specifically, the light rays 126b, for example, from the source 48 strike the outer dioptric ring 120, and particularly the light refracting surface 124 thereof, and are refracted into a substantially collimated bundle of light rays 128b.

Each of the catadioptric rings 130 includes an inner refracting surface 132 and an outer reflecting surface 134, whereby to collimate into substantially parallel bundles of light any light entering the refracting surface 132. More specifically, the light rays 136a, for example, from the source 48 enter the surface 132 of the innermost catadioptric ring 130, are refracted in passing through the surface 132, and are reflected from the surface 134 into substantially parallel bundles of light represented by the rays 138a. In short, the dioptric rings 120 and the catadioptric rings 130 receive the light from the source 48, although the source is disposed quite near the rear surface 112, and collimate the light into substantially parallel bundles within the first or rear transparent body 110.

The front surface of the rear plastic body 110 positioned at the interface 140 between the plastic bodies 110 and 150 is provided with a plurality of controlled spreading optical elements 142 which are generally convex and which at the interface 140 are positioned in physical contact and optical contact with complementarily shaped optical elements 152 on the rear surface of the second or front transparent body 150. Referring specifically to FIGS. 3 and 5, it will be seen that the optical elements 152, and therefore the complementarily shaped optical elements 142, are generally rectangular in plan view and have longer substantially parallel horizontal sides 154 and shorter substantially parallel vertical sides 156, the longer sides 154 being substantially twice the length of the shorter sides 156. The optical elements 152 are curved in all directions and, more specifically, possesses a vertical component of curvature best illustrated in FIG. 6 of the drawings and a horizontal component of curvature best illustrated in FIG. 7 of the drawings. Due to the fact that the plastic bodies 110 and 150 have a substantial yet relatively small difference in the indices of refraction, it is desirable that the optical elements 142 and 152 be aspheric if it is desired to project a uniformly illuminated pattern of light from the lens 100, as will be described more fully hereinafter.

The front or outer surface 160 of the front plastic body 150 is formed as a section of a sphere and accordingly, has a smooth and regular finish free of pits and crevices and the like. The optical elements 142-152 and the surface 160 together form a controlled spreading optical system for directing and spreading the substantially horizontal and collimated light rays 128 and 138 into a predetermined pattern. More specifically, the light rays 128b, for example, are refracted through the interface 140, and particularly through the surfaces of the complementarily shaped optical elements 142-152, and are bent toward each other (it being assumed that the index of refraction of the plastic body 150 is less than that of the plastic body 110) so as to form converging light rays 158b in the plastic body 150. The light rays 150 are further refracted toward one another by the plastic-to-air interface at the surface 160 to form further converging rays 162b, which converge to form a real image at the point 164b, and thereafter diverge as at 166b to form the desired pattern. Each of the optical elements 142-152 forms its own image point 164 and its own spreading light rays 166, the image points 164 as illustrated all lying substantially on the same spherical surface. The resultant pattern of distribution will be substantially a rectangle having substantially uniform light distribution throughout the area thereof when the optical elements 142-152 have the particular aspherical configuration to be described more fully hereinafter. However, it is to be understood that any desired pattern of distribution of the light can be achieved by the proper choice of the shape, number and kinds of controlled spreading optical elements provided at the interface 140.

An important feature of the present invention is the fact that the outermost surface 160 is smooth and regular, i.e., the surface 160 is free of pits, depressions, crevices and the like which might tend to collect water or ice so as to distort the desired pattern of light from the lens 100, or to collect dirt and other debris falling therein so as to materially decrease the amount of light transmitted by the lens 100. In other words, the surface 160 is substantially self-cleaning and does not distort the pattern of light transmitted by the lens 100 and does not attenuate the light transmitted by the lens 100, this result being due primarily to the fact that it is smooth and regular and free of pits and crevices and the like, thereby readily to shed therefrom water and dirt and other debris falling thereon. It is to be understood that other smooth and regular configurations of the surface 160 may be used including a flat or planar surface, a conical surface, a parabolic surface, or any other smooth and regular surface which will readily shed water, dirt and other debris falling thereon.

Another important feature of the present invention resides in the fact that the single interface 140 between the plastic body 110 and the plastic body 150, i.e., the front surface of the body 110 and the rear surface of the body 150, are in both physical contact and optical contact with each other throughout the adjacent surfaces thereof thus forming the single interface 140 therebetween. As a result, there is a minimum loss of light in transmission from the body 110 into a body 150 through the interface 140. This desirable structure results in a great part from the particular method of molding the lens 100 of the present invention which is diagrammatically illustrated in FIGS. 8 and 9 of the drawings. Referring first to FIG. 8, it is preferred to mold the rear lens body 110 first utilizing two mold members or dies 170 and 175. The die 170 has a surface 172 formed with the negative of the rear surface 112 therein including the dioptric rings 120 and the catadioptric rings 130. The other die 175 has a surface 177 thereon which is the negative of the front surface of the plastic body 110 and particularly has therein the negative of the dioptric optical elements 142. There further is formed in the die 170 an annular groove 173 which is to form the flange 102, and an entry way or gate 176 is provided between the two dies 170 and 175 for the admission of the plastic to be molded thereby. The usual stripper pins 178 are also provided to assist in removing the formed plastic body 110 from the dies 170–175.

After the rear plastic body 110 has been formed, the die 175 can be removed, after which the front plastic body 150 can be molded directly on the front surface of the plastic body 110. Alternatively, and as illustrated in FIG. 9, the rear plastic body 110 may be removed from the die 170 and positioned upon a support 180. The support 180 with the plastic body 110 thereon forms one-half of a die set and a second die 182 is provided having a surface 184 which is the negative of the front surface 160 on the plastic body 150. The die 180 further is provided with an entryway or gate 186 for the admission of plastic to form the plastic body 150, and it is also provided with the usual stripper pins 188. After the parts are assembled as illustrated in FIG. 9, plastic is injected through the gate 186 under pressure to fill the space between the front surface of the plastic body 110 and the die surface 184, thus to form the plastic body 150 therebetween. Since the plastic body 150 is actually molded against the plastic body 110, the single interface 140 is formed therebetween and the optical elements 152 on the rear surface of the plastic body 150 are true reproductions of and are truly shaped complementary to the optical elements 142 on the front face of the plastic body 110. In forming both the plastic body 110 and the plastic body 150, it is preferred that injection molding techniques be utilized. After the formation of the front plastic body 150, the completed lens 100 is removed from the dies and is trimmed and cooled in the usual manner. It is to be understood that the order of forming the plastic bodies may be reversed, the plastic body 150 first being molded, and the plastic body 110 thereafter molded thereagainst.

As has been mentioned above, it is preferred that the plastic body 150 be formed of acrylic plastic; in any event the front plastic body 150 should be formed of a plastic which is weather resistant and also has certain characteristics of wear resistance as well as being tough. It further is desirable that the plastic body 150 in certain instances be colored, such as yellow, red, blue, and the like, and in other instances it is desirable that the plastic, or the coloring dye or an added inhibitor serve as an ultraviolet screen to protect other materials disposed behind the plastic body 150 and including the rear plastic body 110.

In an actual example of the present invention, the rear plastic body 110 is formed of polystyrene plastic, as has been pointed out above. The plastic forming the body 110 need not be weather resistant nor need it serve as an ultraviolet screen. In fact, the polystyrene plastic used in the example is actually very sensitive to ultraviolet radiation and quickly becomes brittle and cracks when exposed thereto, and therefore it is desirable that the plastic body 150 have the ultraviolet screening properties pointed out above. In certain instances it may also be desirable to color the plastic body 110.

It further is necessary that there be a substantial difference between the indices of refraction of the two palstics forming the bodies 110 and 150. This requirement is met by the use of an acrylic plastic having an index of refraction of 1.49 in the transparent body 150 and by using polystyrene plastic having an index of refraction of 1.59 in the transparent body 110.

The lens 100 described above is actually less expensive than a lens of the same general size and shape formed of solid acrylic plastic. This arises from the fact that the cost of polystyrene plastic is less than one-half the cost of acrylic plastic and the volume of the plastic body 150 is approximately 25% of the total volume of the lens 100, while the polystyrene plastic in the body 110 is approximately 75% of the total volume of the lens 100. The savings in material costs are greater than the additional molding costs required by the two-step molding operation, whereby the resultant composite lens 100 is less expensive than a lens formed entirely of acrylic plastic and of the same general size and shape. This economy is achieved while retaining all of the valuable weather resistant properties of acrylic plastic and while obtaining the additional advantages of the present invention of having a smooth and regular front surface 160 which materially enhances the performance of the lens 100.

In the absence of the controlled spreading optical elements 142–152 in the lens 100, the collimated light would be refracted upon passing through the front surface 160 and would form a substantially conical beam having essentially a circular cross section at any plane spaced therefrom, this beam having very small divergence and being of limited utility. In an effort to better use this energy, the controlled spreading optical elements 142–152 are provided, the elements as illustrated converting the conical beam of small divergence and circular cross section into a beam of substantially rectangular cross section in which the spreading of the beam in the horizontal direction is substantially twice the spreading of the beam in the vertical direction. As a result, more light is provided in an area where it will be useful for signalling purposes.

The easiest geometric forms of the optical elements 142–152 to create are those constituting portions of a spherical surface. However, when the materials on the opposite sides of the interface 140 have differences in the indices of refraction on the order of those illustrated, namely, 1.59 for the material of the body 110 and 1.49 for the material of the body 150, spherical optical elements introduce substantial spherical aberration which is caused by extreme "lens bending" at the outer portions of the optical elements required by the low ratio of the indices of refraction. Such spherical aberration causes the rays at the outer portions of the optical elements to focus at a different location than those rays from the central portion thereby adversely affecting the uniformity of the resulting light pattern. More specifically, there is a sharper decrease in intensity of the light pattern at wider viewing angles than is desirable.

Accordingly, it is desirable to provide aspherical optical elements 142–152 at the interface 140, these aspherical optical elements preferably having a contour approximating that of a parabola. Referring specifically to FIG. 10 of the drawings, it will be seen that the aspherical optical elements 142–152 provide substantially uniform distribution of the collimated light entering from the right. More specifically, the light incident upon each lens element can be divided into zones 1 through 5 each containing one unit of light. After refraction at the interface 140 and at the front surface 160, the light in each zone is distributed into a 2° zone or beam within the refracted beam which occupies a 10° half angle, i.e., each zone covers 2° of the beam and still contains one unit of light. By contrast, and referring to FIG. 11, each 2° zone in the refracted beam from the spherical element 142′–152′ contains a different amount of light, zone 1 containing 2 units, zone 2 containing 1.3 units, zone 3 containing 0.9 unit, zone 4 containing 0.5 unit and zone 5 containing only 0.3 unit. The results of this distribution of the light is diagrammatically illustrated in FIGS. 12 and 13 of the drawings, wherein it will be seen that the aspherical optical element 142–152 of FIG. 10 provides a substantially uniform distribution of light to 10° on each side of the center line, whereas the spherical optical element of FIG. 11 produces a heavy concentration of light in the first or central 2° zone and substantially no light in the zone between 8° and 10°. Actually, the distribution from the aspherical optical element 142–152 is not absolutely uniform as illustrated in FIG. 12, but it is substantially more uniform than that for the spherical optical element. As stated above, the aspherical optical element 142–152 has a curvature approximating that of a parabola, but more specifically is designed to provide in each 2° zone of the refracted beam substantially the same intensity of light, thereby substantially to improve the distribution of light in the predetermined pattern of the signal issuing from the lens 100.

As illustrated in FIG. 6 of the drawings, a real image is formed by the controlled spreading optical elements 142–152 when these elements are convex and viewed from the front, i.e., the optical element 142 is convex and the optical element 152 is concave, and further provided that the rear body 110 has a higher index of refraction than the front body 150. The invention will be equally operable if the plastic forming the body 110 has a lower index of refraction than the plastic forming the body 150 while maintaining the shape of the optical elements 142–152 as illustrated in FIGS. 3–7 of the drawings. The only difference will be that a virtual image will be formed rather than a real image; however, the resultant light pattern will still have the desired rectangular shape and substantially uniform distribution of light intensity. Likewise, it is possible to reverse the shape of the optical elements 142–152, i.e., the optical elements 142 may be formed concave and the optical elements 152 formed convex. In such a structure, a real image will be formed if the plastic forming the body 110 has an index of refraction lower than that of the plastic forming the body 150; conversely, a virtual image will be formed if the plastic forming the body 110 has an index of refraction higher than that of the plastic forming the body 150. In both cases, the desired rectangular pattern of light will be produced having a good uniformity throughout the area thereof.

There is illustrated in FIGS. 14 and 15 of the drawings a modification of the lens 100 wherein an opaque material is inserted between the front and rear plastic bodies to form a design on the fact of the lens. This form of the lens has been designated generally by the numeral 100A and the various optical portions of the lens have substantially the same configuration as the corresponding optical portions of the lens 100, and therefor like reference numerals have been applied to like parts adding the suffix "A" thereto. Disposed at the interface 140A is an opaque design generally designated by the numeral 190 which may be formed, for example, of a thin metal foil such as aluminum foil or the like, the thickness of the foil having been exaggerated for the purpose of illustration. In forming the lens 100A, the foil design 190 is placed upon the front surface 142A of the plastic body 110A after the formation thereof and the plastic body 150A is molded against the surface 142A and the metal foil 190 to form the interface 140A with the metal foil 190 disposed therein. It will be understood that other opaque materials may be used in place of the metal foil 190, such for example, as a hot stamping or the like.

A different form of controlled spreading optical elements particularly useful in the present invention has been illustrated in the lens 200 shown in FIGS. 16 to 18 of the drawings. The lens 200 includes a first plastic body 210 having a rear surface provided with light collimating optical elements including a central lens element 214, two dioptric rings 220 and a plurality of concentric catadioptric rings 230 all formed and shaped like the corresponding optical elements 114, 120 and 130 described above with respect to lens 100.

The front surface of the plastic body 210 carries a different form of optical elements at the interface 240, the optical elements being generally designated by the numerals 242. As illustrated, the optical elements 242 are curved in a horizontal direction (see FIGS. 16 and 17) and are preferably formed as aspherical optical elements of the type illustrated in detail in FIG. 10 above. The optical elements 242 in a vertical direction are formed substantially linear, whereby to provide a cylindrical form of optical elements curved only in a horizontal direction and substantially linear in the vertical direction. The various optical elements 242 are arranged parallel to each other across the face of the lens and provide controlled spreading of the light in a horizontal direction only, the spreading in the vertical direction being controlled by the optical elements on the rear of the plastic body 210.

The form of the optical elements 242 illustrated in FIGS. 16 to 18 is particularly advantageous in that the machines and methods for forming the dies to mold such optical elements are less expensive than those for making dies for molding optical elements curved in all directions like the optical elements 142–152 described above with respect to the lens 100. The plastic body 250 has the rear surface 252 thereof molded against the optical elements 242 and therefore form the optical elements 252 having shaped complementary to the shape of the contacting adjacent optical elements 242. There is but the single interface 240 between the plastic bodies 210 and 250, whereby to provide for the maximum transmission of light therethrough. The front surface 260 of the plastic body 250 is formed smooth and regular in accordance with the present invention so that water, dirt and other debris falling thereon will be readily shed therefrom, thus providing an essentially self-cleaning surface 260.

The materials of construction of the plastic body 210 and the plastic body 250 may be like those of the plastic bodies 110 and 150, respectively, described above, it being necessary that there be a substantial difference between the indices of refraction of the two plastics forming the bodies 210 and 250. The methods of forming the lens 200 are like those used in forming the lens 100.

There is illustrated in FIGS. 19 and 20 of the drawings a modification of the lens 200, the modification illustrated in FIGS. 19 and 20 being designated by the numeral 200A, like reference numerals being applied to corresponding like parts throughout with the addition of the suffix "A." The lens 200A differs from the lens 200 in that the catadioptric rings 230A are modified to give a measure of controlled spreading of the collimated light in the vertical direction, this being accomplished by curving the reflecting surface 235 on the catadioptric optical elements 230A. More specifically, the reflecting surface is formed convex to provide for a controlled spreading of the light reflected therefrom, this controlled spreading in the vertical direction being illustrated in FIG. 19 and being utilized in the lens 200A to spread the light, for example, 10° in the vertical direction. The 10° spreading of the light by the surfaces 235 can also be utilized as illustrated in FIG. 20 in series with or in combination with the controlled spreading optical elements 242–252 which, for example, spread the light another 10°, thus to control the spreading of the light in the horizontal direction a total of 20°. The resultant pattern is essentially rectangular in shape with a high degree of uniformity throughout the area thereof.

The principle of using the simpler controlled spreading optical elements 242–252 of the type illustrated in the lens 200 can be used to attain controlled spreading of the light in both the vertical direction and the horizontal direction by utilizing three plastic bodies in series. Such a lens is illustrated in FIGS. 21 to 23 of the drawings, the lens being generally designated by the numeral 300. In the lens 300, the rear plastic body 310 is provided with collimating optical elements on the rear surface thereof including concentric dioptric rings 320 having a construction like the dioptric rings 120 and 220 described above, and a plurality of concentric catadioptric rings 330 having a construction like the catadioptric rings 130 and 230 described above and including refracting surfaces 332 and reflecting surfaces 334. The front surface of the rear plastic body 310 is provided with optical elements 342 which are curved in the horizontal direction and linear in the vertical direction, and therefore have the same structure as the controlled spreading optical elements 242–252 described above with respect to FIGS. 16 to 18. An intermediate plastic body 350 is provided having a rear surface shaped complementary to the optical elements 342 to provide optical elements 352 with a single interface 340 therebetween. The optical elements 342–352 provide controlled spreading of the light in a horizontal direction, it being understood that the indices of refraction of the plastics forming the bodies 310 and 350 are substantially different.

The front surface of the intermediate plastic body 350 is also provided with controlled spreading optical elements 362 which are curved in a vertical direction and are substantially linear in a horizontal direction and are shaped substantially like the optical elements 342–352 but are oriented in a direction disposed 90° with respect thereto. The optical elements 362 spread the light in a vertical direction in a controlled manner and in cooperation with the optical elements 342–352 provide essentially a rectangular pattern.

An outer or front plastic body 370 is provided having a rear surface shaped complementary to the front surface of the intermediate plastic body 350 to provide horizontally arranged optical elements 372 curved only in the vertical direction and cooperating with the optical elements 362 to provide controlled spreading of the light in the vertical direction. In accordance with the present invention, the front surface 380 of the plastic body 370 is formed smooth and regular so that it readily sheds therefrom water, dirt and other debris, thus providing a substantially self-cleaning outer surface 380 for the lens 300. Accordingly, all of the advantages of the smooth outer surface 380 are achieved and a controlled spreading of the light in both the horizontal and vertical directions is obtained from the lens 300. However, the collimating optical elements including the dioptric rings 320 and the catadioptric rings 330 all have straight or conical surface which are readily formed, and the light spreading optical elements 342–352 and 362–372 are both linear in one direction and curved only in one direction thus to provide shapes which are readily reproduced. More specifically, the dies for forming the catadioptric reflecting surface 334, the dioptric refracting surface 342 and the dioptric refracting surface 362 can be readily made with standard machinery and utilizing inexpensive forming techniques that are more economical than those for forming the convex catadioptric surface 235 in FIG. 19 and the compoundly curved dioptric surfaces 142 in FIGS. 3 to 7.

Preferably, the outer plastic body 370 is formed of a weather resistant material such as acrylic plastic having an index of refraction of 1.49; the intermediate plastic body 350 is preferably formed of polystyrene plastic having an index of refraction of 1.59; and the inner plastic body 310 is preferably formed of acrylic plastic having an index of refraction of 1.49; whereby the plastics on the opposite sides of the interfaces 340 and 360 have substantial differences between the indices of refraction thereof. It is to be understood that other combinations of plastics may be utilized provided only that the plastics on the opposite sides of the optical interfaces have indices of refraction substantially different from one another. When the lens 300 has the preferred materials of constructions in the three plastic bodies thereof, the image formed in the horizontal spreading of the light is a virtual image, whereas the image formed in the vertical spreading of the light is a real image, the resultant overall pattern being substantially a rectangle having a good distribution of light throughout the area thereof.

In forming the optical lens 300, the rear plastic body 310 is first formed in a manner like that illustrated in FIG. 8 above. The intermediate plastic body 350 is then molded against the front surface of the rear plastic body 310, the front surface of the rear plastic body 310 forming one face of the mold and a metal die having a negative of the front surface of the intermediate plastic body 350 forming the other face. The combination of the plastic bodies 310 and 350 is then placed in a mold such as that illustrated in FIG. 9 to mold the front plastic body 370 thereagainst. The completed lens 300 is removed from the final set of dies and the flash trimmed in the usual manner.

Although the cylindrical optical elements 242–252, 242–352, and 362–372 are easier to form than are the spherical optical elements 142–152 that are curved in all directions, in that it is easier to form the negative thereof in metal to provide a die for the molding thereof, it is still easier and less expensive to form spherical dioptric optical elements. There is shown in FIGS. 24 to 26 a form of the present invention utilizing three juxtaposed transparent plastic bodies having light collimating optical elements on the rear surface of the rear body, spherical controlled spreading optical elements at the interface between the rear and the intermediate plastic bodies, and spherical controlled spreading optical elements at the interface between the intermediate and the front plastic bodies, the lens forming a substantially rectangular light pattern having a substantial uniformity of light throughout the area thereof. The more uniform distribution of light is obtained by placing two spherical optical elements in series with each and both arranged to refract the light in the same direction so that the total desired bending of the light is obtained, yet little spherical aberration is obtained since each spherical optical element refracts the light through only a small angle.

Referring to FIGS. 24 to 26, such a lens 400 is illustrated including a rear plastic body 410, an intermediate plastic body 450, and a front plastic body 470. The rear surface of the plastic body 410 is provided with collimating optical elements including concentric dioptric rings 420 having a construction like the dioptric rings 120 described above, and a plurality of concentric catadioptric rings 430 having a construction like the catadioptric rings 130 described above and including refracting surfaces 432 and reflecting surfaces 434. The front surface of the rear plastic body 410 is provided with spherical optical elements 442 which are curved in all directions but have a width substantially twice the height thereof, the elements 442 being concave.

An intermediate plastic body 450 is provided having a rear surface shaped complementary to the spherical optical elements 442 to provide convex spherical optical elements 452 with a single interface 440 therebetween. The optical elements 442–452 provide controlled spreading of the light in both the horizontal and vertical directions, it being understood that the indices of refraction of the plastics forming the bodies 410 and 450 are substantially different. The front surface of the intermediate plastic body 450 is also provided with spherical controlled spreading optical elements 462 which are curved in all directions but have a width substantially twice the height thereof, the elements 462 also being convex and in general alignment both horizontally and vertically with the elements 442–452.

An outer or front plastic body 470 is provided having a rear surface shaped complementary to the front surface of the intermediate plastic body 450 to provide concave spherical controlled spreading optical elements 472 shaped complementary to the convex spherical optical elements 462 with a single interface 460 therebetween. The optical elements 462–472 provide controlled spreading of the light in both the horizontal and vertical directions, it being understood that the indices of refraction of the plastics forming the bodies 450 and 470 are substantially different; the spreading of the light in the horizontal direction will be substantially twice that in the vertical direction. In accordance with the present invention, the front surface 480 of the plastic body 470 is formed smooth and regular so that it readily sheds therefrom water, dirt and other debris, thus providing a substantially self-cleaning outer surface 480 for the lens 400.

Preferably, the outer plastic body 470 is formed of a weather resistant material, such as acrylic plastic, having an index of refraction of 1.49; the intermediate plastic body 450 is preferably formed of polystyrene plastic having an index of refraction of 1.59; and the inner plastic body 410 is preferably formed of acrylic plastic having an index of refraction of 1.49; whereby the plastics on the opposite sides of the interfaces 440 and 460 have substantial differences between the indices of refraction thereof. It is to be understood that other combinations of plastics may be utilized provided only that the plastics indices of refraction substantially different from one another. When the lens 400 has the specified preferred materials of construction in the three plastic bodies thereof, the image formed in both the horizontal and vertical directions is a real image.

More specifically and referring to FIG. 25, the collimated light in the body 410 is refracted in the vertical direction a first small amount at the interface 440 and toward the axis thereof as indicated by the path of the rays 458 in the body 450; the light in the body 450 is refracted a second small amount at the interface 460 and toward the axis thereof as indicated by the path of the rays 468 in the body 470; the light in the body 470 is refracted a third amount at the air-to-plastic interface 480 as indicated by the path of the rays 482 and converges at a focal point 484 and thereafter spreads, as at 486 to form the desired vertical pattern of, for example, 10° on either side of the horizontal center of the lens 400. Referring to FIG. 26, it will be seen that the collimated light is refracted in a like manner in the horizontal direction into slightly converging rays 459, then rays 479 and finally fully converging rays 483 that form a real image at point 485, and thereafter diverge as at 487 to form the desired vertical pattern of, for example, 20° on either side of the vertical center of the lens 400.

This desired spreading of the light results in an overall pattern that is substantially a rectangle having a good distribution of the light throughout the area thereof despite the fact that the optical elements 442–452 and 462–472 are spherical. This desired result is obtained by using the three interfaces 440, 460 and 480 in series, each directing the light in the same sense, i.e., converging toward the axis as illustrated, so that the spherical aberration at the interfaces 440 and 460 is negligible since there is no "severe bending" of the light passing therethrough. Substantial economies in the manufacture of the dies to produce the surfaces 442, 452, 462 and 472 are realized by forming these elements as portions of a spherical surface. The method of making the lens 400 is like that for making the lens 300 described above.

There have been illustrated and described several preferred embodiments of the lens and the methods of making the lens of the present invention. It is to be understood that various changes and modifications can be made therein without departing from the spirit and scope of the invention, and it is intended to cover all such changes and modifications by the appended claims.

What is claimed is:

1. A rigid lens comprising a first transparent body of a first plastic and having a rear surface and a front surface thereon, said rear surface on said first body having collimating optical elements thereon, said front surface on said first body having first controlled spreading optical elements thereon for directing light passing therethrough into a predetermined pattern, and a second transparent body of a second plastic and having a rear surface and a front surface thereon, said rear surface on said second body having second controlled spreading optical elements thereon shaped complementary to said first controlled spreading optical elements for directing light passing therethrough into said predetermined pattern, said front surface on said first body and said rear surface on said second body being in both physical contact and optical contact throughout the adjacent areas thereof to provide a single interface therebetween, said front surface on said second body being smooth and regular and free of pits and crevices and the like thereby readily to shed therefrom water and dirt and other debris falling thereon, said first plastic having an index of refraction substantially different from that of said second plastic thereby to obtain a substantial refraction of the light passing therebetween and through said first and second optical elements and said single interface.

2. The lens set forth in claim 1, wherein said first and second controlled spreading optical elements are curved in one direction and are substantially linear in a second direction substantially perpendicular to said one direction, whereby to distribute the light passing therethrough into a predetermined pattern in said one direction.

3. The lens set forth in claim 1, wherein said first and second controlled spreading optical elements are curved in two directions perpendicular to each other for directing light passing therethrough into a predetermined pattern in said two directions.

4. A rigid lens comprising a first transparent body of a first plastic and having a rear surface and a front surface thereon, said rear surface on said first body having collimating optical elements thereon, said front surface on said first body having first controlled spreading aspherical optical elements thereon for directing light passing therethrough into a predetermined pattern in the direction of curvature thereof, and a second transparent body of a second plastic and having a rear surface and a front surface thereon, said rear surface on said second body having second controlled spreading aspherical optical elements thereon shaped complementary to said first controlled spreading aspheric optical elements for directing light thereto into said predetermined pattern, said front surface on said first body and said rear surface on said second body being in both physical contact and optical contact throughout the adjacent areas thereof to provide a single interface therebetween, said front surface on said second body being smooth and regular and free of pits and crevices and the like thereby readily to shed therefrom water and dirt and other debris falling thereon, said first plastic having an index of refraction substantially different from that of said second plastic thereby to obtain a substantial refraction of the light passing therebetween and through said first and second optical elements and said single interface.

5. The lens set forth in claim 4, wherein the said aspherical optical elements have a curvature approximating a parabola in one direction and are substantially linear in a direction substantially perpendicular to said one direction.

6. The lens set forth in claim 4, wherein said aspherical optical elements have a curvature approximating a parabola in all directions.

7. A rigid lens comprising a first transparent body of a first plastic and having a rear surface and a front surface thereon, said rear surface on said first body having collimating optical elements thereon, said front surface on said first body having first controlled spreading optical elements thereon for directing light passing therethrough into a predetermined pattern, and a second transparent body of a second plastic and having a rear surface and a front surface thereon, said rear surface on said second body having second controlled spreading optical elements thereon shaped complementary to said first controlled spreading optical elements for directing light passing therethrough into said predetermined pattern, said front surface on said first body and said rear surface on said second body being in both physical contact and optical contact throughout the adjacent areas thereof to provide a single interface therebetween, an opaque design creating member disposed between said first and second bodies at said interface for providing the predetermined design within said predetermined pattern of light, said front surface on said second body being smooth and regular and free of pits and crevices and the like thereby readily to shed therefrom water and dirt and other debris falling thereon, said first plastic having an index of refraction substantially different from that of said second plastic thereby to obtain a substantial refraction of the light passing therebetween and through said first and second optical elements and said single interface.

8. A rigid lens comprising a first transparent body of a first plastic and having a rear surface and a front surface thereon, said rear surface on said first body having collimating optical elements thereon including catadioptric optical elements for collimating light passing therethrough, said catadioptric optical elements including light refracting surfaces and curved light reflecting surfaces for directing light passing therethrough into a first predetermined pattern in a first predetermined direction, said front surface on said first body having first controlled spreading optical elements thereon for directing light passing therethrough into a second predetermined pattern in a second predetermined direction, and a second transparent body of a second plastic and having a rear surface and a front surface thereon, said rear surface on said second body having second controlled spreading optical elements thereon shaped complementary to said first controlled spreading optical elements for directing light passing therethrough into said second predetermined pattern, said front surface on said first body and said rear surface on said second body being in both physical contact and optical contact throughout the adjacent areas thereof to provide a single interface therebetween, said front surface on said second body being smooth and regular and free of pits and crevices and the like thereby readily to shed therefrom water and dirt and other debris falling thereon.

9. A rigid lens comprising a first transparent body of a first plastic and having a rear surface and a front surface thereon, said rear surface on said first body having collimating optical elements thereon, said front surface on said first body having first optical elements thereon for directing light passing therethrough into a first predetermined pattern, a second transparent body of a second plastic and having a rear surface and a front surface thereon, said rear surface of said second body having optical elements thereon shaped complementary to said first optical elements for directing light passing therethrough into said first predetermined pattern, said front surface on said first body and said rear surface on said second body being in both physical contact and optical contact throughout the adjacent areas thereof to provide a first single interface therebetween, said front surface of said second body having second optical elements thereon for directing light passing therethrough into a second predetermined pattern, and a third transparent body of a third plastic and having a rear surface and a front surface therein, said rear surface on said third body having optical elements therein shaped complementary to said second optical elements for directing light passing therethrough into said second predetermined pattern, said front surface on said second body and said rear surface on said third body being in both physical contact and optical contact throughout the adjacent areas thereof to provide a second single interface therebetween, said front surface on said third body being smooth and regular and free of pits and crevices and the like thereby readily to shed therefrom water and dirt and other debris falling thereon, said first plastic having an index of refraction substantially different from that of said second plastic and said second plastic having an index of refraction substantially different from that of said third plastic thereby to obtain a substantial refraction of the light at said first and second interfaces.

10. The lens set forth in claim 9, wherein said first optical elements are oriented to direct the light passing therethrough into a first predetermined pattern substantially only in one direction, and said second optical elements are oriented to direct light passing therethrough into a second predetermined pattern substantially only in a second direction.

11. The lens set forth in claim 9, wherein said first optical elements are curved only in a first direction and are substantially linear in the direction substantially perpendicular to said first direction, and said second optical elements are curved in a second direction substantially perpendicular to said first direction and are substantially linear in a direction perpendicular to said second direction.

12. The lens set forth in claim 9, wherein said first optical elements are curved in all directions, and said second optical elements are curved in all directions.

13. A rigid lens comprising a first transparent body of a first plastic and having a rear surface and a front surface thereon, said rear surface on said first body having collimating optical elements thereon for collimating light passing therethrough, said front surface on said first body having first spherical optical elements thereon for directing light passing therethrough in a predetermined direction with respect to the element axis and into a predetermined pattern, a second transparent body of a second plastic and having a rear surface and a front surface thereon, said rear surface on said second body having optical elements thereon shaped complementary to said first optical elements for directing light passing therethrough in said one direction and into said first predetermined pattern, said front surface on said second body and said rear surface on said second body being in both physical contact and optical contact throughout the adjacent areas thereof, said front surface of said second body having second spherical optical elements thereon for directing light passing therethrough in said predetermined direction and into said predetermined pattern, and a third transparent body of a third plastic and having a rear surface and a front surface thereon, said rear surface on said third body having optical elements therein shaped complementary to said second optical elements for directing light passing therethrough in said predetermined direction and into said predetermined pattern, the front surface on said second body and said rear surface on said third body being in both physical contact and optical contact throughout the adjacent areas thereof to provide a second single interface therebetween, the front surface on said third body being smooth and regular and free of pits and crevices and the like thereby readily to shed therefrom water and dirt and other debris falling thereon, said first plastic having an index of refraction substantially different from that of said second plastic and said second plastic having an index of refraction substantially different from that of said third plastic thereby to obtain a substantial refraction of the light at said first and second interfaces.

14. The lens set forth in claim 1, wherein said first plastic is a polystyrene plastic and said second plastic is an acrylic plastic.

15. The lens set forth in claim 1, wherein said first plastic and said second plastic are both synthetic organic plastics, and said second plastic body comprises an ultraviolet shield for said first plastic body.

References Cited

UNITED STATES PATENTS

| | | | |
|---|---|---|---|
| 2,286,201 | 6/1942 | Farrand et al. | |
| 2,351,034 | 6/1944 | Gabor. | |
| 2,405,301 | 8/1946 | Grey | 88—57 |
| 2,567,654 | 9/1951 | Siezen | 88—57 |
| 2,762,912 | 9/1956 | Onksen et al. | 240—106.1 |
| 2,831,394 | 4/1958 | Heenan et al. | 88—57 |
| 2,950,644 | 8/1960 | Land et al. | 88—1 |
| 2,972,932 | 2/1961 | Marcus et al. | 88—57 |
| 2,978,956 | 4/1961 | Howell | 88—57 |
| 2,990,306 | 6/1961 | Dyer | 161—408 |
| 2,991,693 | 7/1961 | MacNeille | 88—1 |
| 3,125,615 | 3/1964 | Redner | 264—1 |
| 3,131,238 | 4/1964 | Carnall et al. | 264—1 |
| 3,155,764 | 10/1964 | Gill | 88—82 |
| 3,177,397 | 4/1965 | Keeran | 88—57 |
| 3,213,753 | 10/1965 | Rogers | 88—57 |

DAVID H. RUBIN, *Primary Examiner.*

JEWELL H. PEDERSEN, A. H. BRODMERKEL,
*Examiners.*

R. J. STERN, F. MARLOWE, *Assistant Examiners.*

UNITED STATES PATENT OFFICE
CERTIFICATE OF CORRECTION

Patent No. 3,383,676            May 14, 1968

Robert I. Nagel

It is certified that error appears in the above identified patent and that said Letters Patent are hereby corrected as shown below:

Column 3, line 41, "directions" should read -- direction --. Column 7, line 12, "palstics" should read -- plastics --. Column 8, line 61, "fact" should read -- face --. Column 11, line 28, "illustrateed" should read -- illustrated --; line 33, "242-352" should read -- 342-352 --. Column 12, line 35, after "plastics", second occurrence, insert -- on the opposite sides of the optical interfaces have --.

Signed and sealed this 28th day of October 1969.

(SEAL)
Attest:

Edward M. Fletcher, Jr.
Attesting Officer

WILLIAM E. SCHUYLER, JR.
Commissioner of Patents